(12) United States Patent
Luo et al.

(10) Patent No.: US 11,956,275 B2
(45) Date of Patent: Apr. 9, 2024

(54) ASYMMETRIC-MAN-IN-THE-MIDDLE CAPTURE BASED APPLICATION SHARING PROTOCOL TRAFFIC RECORDATION

(71) Applicants: Yang Luo, Shanghai (CN); Jian Zhang, Shanghai (CN); Qian-Ru Zhai, Shanghai (CN); Zhenbin Lin, Shanghai (CN); MICRO FOCUS LLC, Santa Clara, CA (US)

(72) Inventors: Yang Luo, Shanghai (CN); Jian Zhang, Shanghai (CN); Qian-Ru Zhai, Shanghai (CN); Zhenbin Lin, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 351 days.

(21) Appl. No.: 17/283,227

(22) PCT Filed: Oct. 11, 2018

(86) PCT No.: PCT/CN2018/109791
§ 371 (c)(1),
(2) Date: Apr. 6, 2021

(87) PCT Pub. No.: WO2020/073267
PCT Pub. Date: Apr. 16, 2020

(65) Prior Publication Data
US 2021/0352106 A1 Nov. 11, 2021

(51) Int. Cl.
*H04L 9/40* (2022.01)
(52) U.S. Cl.
CPC ........ *H04L 63/166* (2013.01); *H04L 63/0823* (2013.01); *H04L 63/102* (2013.01); *H04L 63/20* (2013.01)

(58) Field of Classification Search
CPC . H04L 63/166; H04L 63/0823; H04L 63/102; H04L 63/20; H04L 63/168; G06F 21/606
See application file for complete search history.

(56) References Cited

U.S. PATENT DOCUMENTS 7,913,084 B2    3/2011  Medvinsky et al.
9,176,838 B2 *  11/2015  Li ....................... H04L 63/0227
(Continued)

FOREIGN PATENT DOCUMENTS

CN      103605487 A     2/2014
WO      WO-WO0052887 A1  9/2000

OTHER PUBLICATIONS

International Search Report and Written Opinion prepared by the ISA/CN dated Jun. 28, 2019, for International Application No. PCT/CN2018/109791.

(Continued)

*Primary Examiner* — Abiy Getachew
(74) *Attorney, Agent, or Firm* — Sheridan Ross P.C.

(57) ABSTRACT

In some examples, with respect to asymmetric-man-in-the-middle capture based application sharing protocol traffic recordation, a dynamic-link library that alters application programming interface calls with respect to communication between an application sharing protocol client and an application sharing protocol server may be injected into the application sharing protocol client. Based on the injected dynamic-link library, data from the communication between the application sharing protocol client and the application sharing protocol server may be ascertained. Further, based on the ascertained data, a test script may be generated to test operation of an application associated with the communication between the application sharing protocol client and the application sharing protocol server.

20 Claims, 8 Drawing Sheets

(56) References Cited

U.S. PATENT DOCUMENTS

| | | | |
|---|---|---|---|
| 9,374,368 B1* | 6/2016 | Roth | H04L 63/123 |
| 10,059,957 B2* | 8/2018 | He | C07K 14/415 |
| 2007/0277231 A1* | 11/2007 | Medvinsky | H04L 63/0815 |
| | | | 726/5 |
| 2013/0191627 A1 | 7/2013 | Ylonen et al. | |
| 2015/0030313 A1 | 1/2015 | Tammisalo et al. | |
| 2016/0088109 A1* | 3/2016 | Chen | H04L 67/10 |
| | | | 709/203 |
| 2017/0139816 A1 | 5/2017 | Sapozhnikov et al. | |

OTHER PUBLICATIONS

MicrosoftSecurityandComplianceTeam, "Configuring Terminal Servers for Server Authentication to Prevent "Man in the Middle" Attacks," Microsoft, Jul. 21, 2008, 3 pages.

International Search Report/Written Opinion; PCT/CN2018/109791; dated Jul. 10, 2019; 9 Pages.

RDPY—RDP Security Tool for Hacking Remote Desktop Protocol, Darknet, last updated Nov. 21, 2017, 5 pages.

Remote Desktop Session Recording Software for Windows Servers, TSFactory LLC, as of Feb. 23, 2018, 4 pages.

SSL "Man-In-The-Middle" attacks on RDP, Portcullis Computer Security LTD & Portcullis Inc., Apr. 3, 2014, 6 pages.

* cited by examiner

```
INJECT, INTO AN APPLICATION SHARING PROTOCOL CLIENT, A
DYNAMIC-LINK LIBRARY THAT ALTERS APPLICATION PROGRAMMING
INTERFACE CALLS WITH RESPECT TO COMMUNICATION BETWEEN
THE APPLICATION SHARING PROTOCOL CLIENT AND AN APPLICATION
SHARING PROTOCOL SERVER
702
```

```
SELECTIVELY IMPLEMENT TRANSPORT LAYER SECURITY (TLS)
AUTHENTICATION OR CREDENTIAL SECURITY SUPPORT PROVIDER
PROTOCOL (CREDSSP) AUTHENTICATION FOR COMMUNICATION WITH
THE APPLICATION SHARING PROTOCOL CLIENT OR THE APPLICATION
SHARING PROTOCOL SERVER
704
```

```
ASCERTAIN, BASED ON THE INJECTED DYNAMIC-LINK LIBRARY, DATA
FROM THE COMMUNICATION BETWEEN THE APPLICATION SHARING
PROTOCOL CLIENT AND THE APPLICATION SHARING PROTOCOL
SERVER
706
```

```
GENERATE, BASED ON THE ASCERTAINED DATA, A TEST SCRIPT TO
TEST OPERATION OF AN APPLICATION ASSOCIATED WITH THE
COMMUNICATION BETWEEN THE APPLICATION SHARING PROTOCOL
CLIENT AND THE APPLICATION SHARING PROTOCOL SERVER
708
```

ASYMMETRIC-MAN-IN-THE-MIDDLE CAPTURE BASED APPLICATION SHARING PROTOCOL TRAFFIC RECORDATION

CROSS-REFERENCE TO RELATED APPLICATIONS

This application is a national stage application under 35 U.S.C. 371 and claims the benefit of PCT Application No. PCT/CN2018/109791 having an international filing date of 11 Oct. 2018, which designated the United States, the entire contents of which are incorporated herein by reference.

BACKGROUND

A variety of tools may be used to share data between a client computer at a local location and a remote computer at a remote location. An example of a tool to share data may include an application sharing protocol that may be used to connect the client computer to the remote computer over a network connection. Data that is shared may be subject to a variety of analysis, such as, recordation, test script generation, etc.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Apparatuses for asymmetric-man-in-the-middle capture based application sharing protocol traffic recordation, methods for asymmetric-man-in-the-middle capture based application sharing protocol traffic recordation, and non-transitory computer readable media having stored thereon machine readable instructions to provide asymmetric-man-in-the-middle capture based application sharing protocol traffic recordation are disclosed herein. The apparatuses, methods, and non-transitory computer readable media disclosed herein provide for bypassing of an authentication mechanism in an application sharing protocol, and recordation of a communication with respect to the application sharing protocol.

With respect to the application sharing protocol disclosed herein, an example of the application sharing protocol may include the REMOTE DESKTOP PROTOCOL, and other such protocols. The application sharing protocol may provide a user with a graphical user interface to connect to another computer (e.g., a remote computer) over a network connection. The user may utilize application sharing protocol client software for connection to the other computer, while the other computer that is being connected to may execute application sharing protocol server software. Performance of the application sharing protocol may be tested, for example, by using performance testing tools such as LOADRUNNER, and other such performance testing tools. The performance testing tools may record traffic associated with a user application, for example, for test script generation.

With respect to recordation of traffic associated with a user application, a man-in-the-middle service may be utilized by a performance testing tool. As a first step, the performance testing tool may connect to the user application, and may capture socket connection application programming interfaces (APIs). This capture may also be referred to as a "hijacking" of the APIs. When the user application attempts to connect to a remote server, the connected performance testing tool may change a target server Internet protocol (IP)/port to redirect this connection to a local transmission control protocol (TCP) server. The local TCP server may initiate a connection with the remote server. Both the remote server and the client may send their data to the local TCP server, and the local TCP server may forward the data to the client or the remote server. In this manner, the local TCP server utilized by the performance testing tool may perform an intermediate role between the client and the remote server, and may thus ascertain and change traffic as needed.

The application sharing protocol may utilize security mechanisms to protect unauthorized access to this communication between the client and the remote server. The implementation of such security mechanisms may add technical challenges to the design and utilization of a man-in-the-middle connection between the client and the remote server, which may need to access the communication between the client and the remote server, for example, for test script generation.

Yet further, with respect to the aforementioned security mechanisms implemented by the application sharing protocol, the application sharing protocol may provide different types of encryption/authentication security mechanisms. These encryption/authentication security mechanisms may include general application sharing protocol encryption, Transport Layer Security (TLS) based authentication, and Credential Security Support Provider protocol (CredSSP) based authentication. The CredSSP may be executed on top of TLS, and thus may be denoted as an "hybrid authentication". During hybrid authentication, the remote server may encrypt TLS connection data with its CredSSP token from an authenticator. When the man-in-the-middle service intercepts this data, the man-in-the-middle service may re-encrypt its own TLS connection data with server credentials. However, the man-in-the-middle service may not be able to obtain the server side credential, and its TLS connection data may be different than the actual server side. Thus, it may not be possible for the man-in-the-middle service to be identified as the remote server by the client side, and the captured connection may be aborted with the recording thus being unable to be performed.

The apparatuses, methods, and non-transitory computer readable media disclosed herein address at least the aforementioned technical challenges by providing for the bypassing of an authentication mechanism in an application sharing protocol, and recordation of a communication with respect to the application sharing protocol. That is, the apparatuses, methods, and non-transitory computer readable media disclosed herein may provide for recordation of data from the communication with respect to the application sharing protocol, where the recorded data may be used, for example, for test script generation.

In examples described herein, module(s), as described herein, may be any combination of hardware and programming to implement the functionalities of the respective module(s). In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

Figure 1:
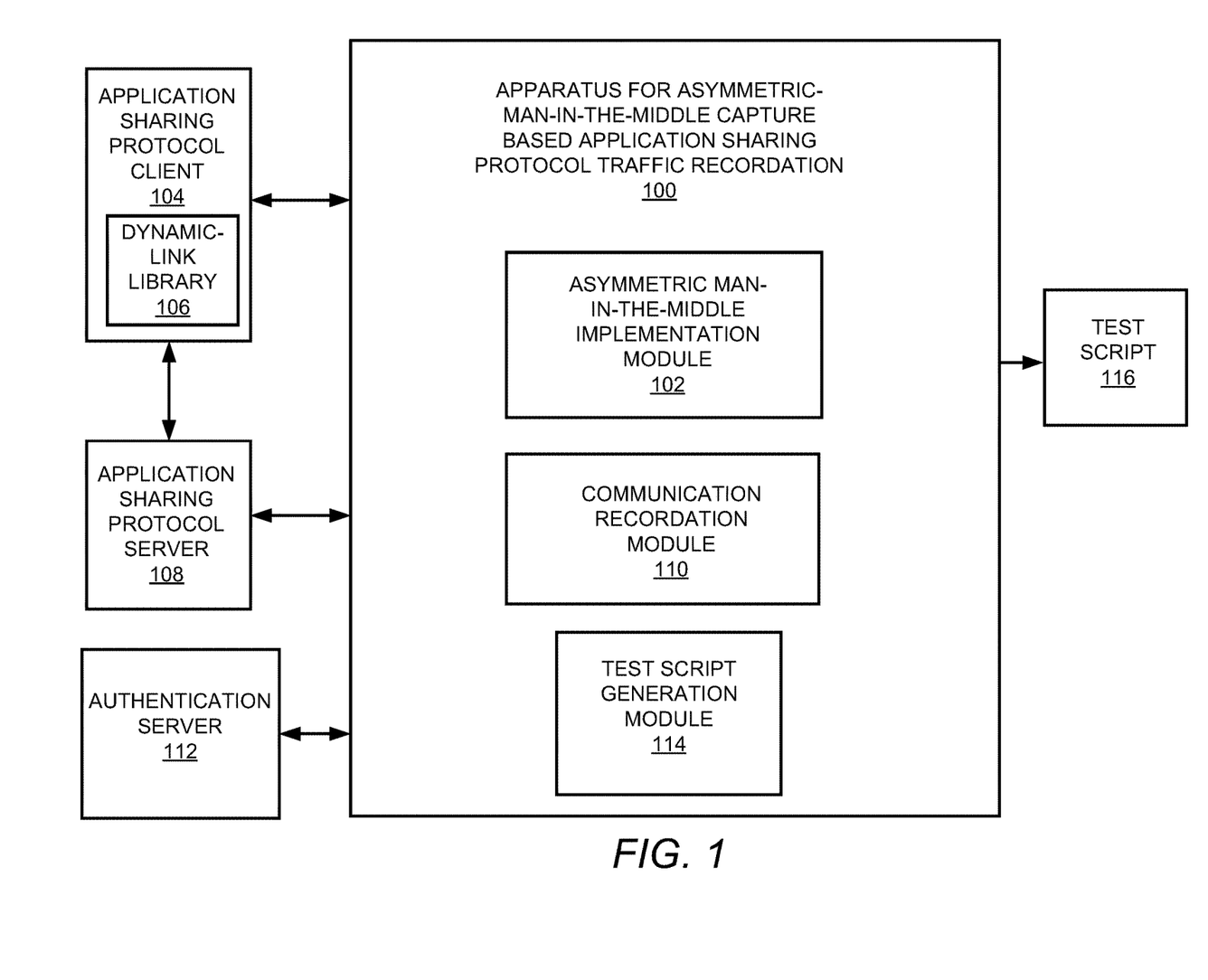
FIG. 1 illustrates an example layout of an apparatus for asymmetric-man-in-the-middle capture based application sharing protocol traffic recordation.

FIG. 1 illustrates an example layout of an apparatus for asymmetric-man-in-the-middle capture based application sharing protocol traffic recordation (hereinafter also referred to as "apparatus 100").

Referring to FIG. 1, the apparatus 100 may include an asymmetric man-in-the-middle implementation module 102 to inject, into an application sharing protocol client 104, a dynamic-link library 106 that alters application programming interface calls with respect to communication between the application sharing protocol client 104 and an application sharing protocol server 108. The dynamic-link library 106 injection and hooking mechanism may utilize an application programming interface (API) to "open" a target process, and create a remote thread inside the target process to load the dynamic-link library 106. Once the dynamic-link library 106 is loaded, an import address table (IAT) structure may be enumerated and altered. The IAT may be used to facilitate location of an API address. In this manner, when the existing code in a target process tries to invoke system APIs, the existing code may call the alternative API in the dynamic-link library 106 through the altered IAT. For example, when the application sharing protocol client 104 attempts a call socket API such as "socket" and "connect", the actual functions being invoked may include "socketAlt-ernative" and "connectAlternative", respectively, and may be implemented in the dynamic-link library 106.

The asymmetric man-in-the-middle implementation module 102 may implement Transport Layer Security (TLS) authentication for communication between the apparatus 100 (e.g., the asymmetric man-in-the-middle implementation module 102) and the application sharing protocol client 104. Further, the asymmetric man-in-the-middle implementation module 102 may implement Credential Security Support Provider protocol (CredSSP) authentication for communication between the apparatus 100 (e.g., the asymmetric man-in-the-middle implementation module 102) and the application sharing protocol server 108.

According to examples disclosed herein, for communication from the application sharing protocol client 104 to the application sharing protocol server 108, the asymmetric man-in-the-middle implementation module 102 may redirect, based on the dynamic-link library 106, the communication from the application sharing protocol client 104 to the apparatus 100, and further from the apparatus 100 to the application sharing protocol server 108. When the application sharing protocol client 104 attempts to establish a connection to the application sharing protocol server 108 through "socket" and "connect" system APIs, as discussed above, the alternative functions "socketAlternative" and "connectAlternative" implemented in the asymmetric man-in-the-middle implementation module 102 may be invoked. According to examples disclosed herein, the target host and port may be changed to a local server inside the asymmetric man-in-the-middle implementation module 102. In this manner, the application sharing protocol client 104 may get a socket handle to the local server. All following data sent by the application sharing protocol client 104 may arrive at the local server, and may be read through a "recv" API in the dynamic-link library 106. Meanwhile, the asymmetric man-in-the-middle implementation module 102 may start another connection to the application sharing protocol server 108. For data packets from the application sharing protocol client 104, the dynamic-link library 106 may forward each data packet to the application sharing protocol server 108, and may alter the data as needed.

According to examples disclosed herein, for communication from the application sharing protocol server 108 to the application sharing protocol client 104, the asymmetric man-in-the-middle implementation module 102 may redirect, based on the dynamic-link library 106, the communication from the application sharing protocol server 108 to the apparatus 100, and further from the apparatus 100 to the application sharing protocol client 104. The connection at the application sharing protocol server 108 may be established by the asymmetric man-in-the-middle implementation module 102, and thus all data sent from the application sharing protocol server 108 may arrive at the asymmetric man-in-the-middle implementation module 102. Further, the asymmetric man-in-the-middle implementation module 102 may hold the connection from the application sharing protocol client 104, and thus, the application sharing protocol client 104 may forward the data from the application sharing protocol server 108 to the asymmetric man-in-the-middle implementation module 102, and update the data as needed.

A communication recordation module 110 may ascertain, based on the injected dynamic-link library 106, data from the communication between the application sharing protocol client 104 and the application sharing protocol server 108. That is, the communication recordation module 110 may record, based on the injected dynamic-link library 106, data from the communication between the application sharing protocol client 104 and the application sharing protocol server 108.

According to examples disclosed herein, the communication recordation module 110 may ascertain initiation of the communication between the application sharing protocol client 104 and the application sharing protocol server 108. The communication recordation module 110 may ascertain, based on the initiation of the communication between the application sharing protocol client 104 and the application sharing protocol server 108, credentials to login to the application sharing protocol server 108. The credentials to login may include a combination of domain name, user name, and password. The communication recordation module 110 may utilize the credentials to obtain a token from an authentication server 112. In this regard, during authentication, the asymmetric man-in-the-middle implementation module 102 may send the credentials to the authentication server 112. The authentication server 112 may verify the credentials based on its database. If authentication passes, the authentication server 112 may send a ticket (binary stream formatted) back to the asymmetric man-in-the-middle implementation module 102. Further, the communication recordation module 110 may utilize the token for CredSSP authentication to forward data between the application sharing protocol client 104 and the application sharing protocol server 108. In this regard, the token from CredSSP may be used to encrypt the login information, and may be exchanged between the application sharing protocol client 104 and the application sharing protocol server 108.

A test script generation module 114 may generate, based on the ascertained data, a test script 116 to test operation of an application associated with the communication between the application sharing protocol client 104 and the application sharing protocol server 108. For example, the application may implement the application sharing protocol client 104, or may include a different application. According to examples disclosed herein, the test script may include, for example, a high level abstraction of application behavior during application sharing protocol login and remote operation, such as application sharing protocol connection to server, application sharing protocol mouse click, application sharing protocol sync on image, etc. During test script execution, the test script may be interpreted by a test engine, and the test engine may send or wait for relevant network data based on the application sharing protocol network protocol. The aforementioned application that may be tested by the test script 116 may be disposed on a computer system that includes the application sharing protocol client 104 (if the application is different from the application sharing protocol client 104), where the computer system may share data with a remote computer system that executes application sharing protocol server software. In this regard, the apparatus 100 may be similarly disposed on the same computer as the application sharing protocol client 104.

With continued reference to FIG. 1, with respect to the asymmetric man-in-the-middle implementation module 102, when the asymmetric man-in-the-middle implementation module 102 communicates with the application sharing protocol server 108, the communication recordation module 110 may implement CredSSP authentication. However, for the connection between the application sharing protocol client 104 and the asymmetric man-in-the-middle implementation module 102, the communication recordation module 110 may implement TLS security.

When the test script generation module 114, which may be a component of a performance testing tool, launches the application sharing protocol client 104, the communication recordation module 110 may inject the dynamic-link library 106 with the man-in-the-middle service implemented by the asymmetric man-in-the-middle implementation module 102 into this process. The application sharing protocol configuration setting at the client side may be customized such that the application sharing protocol client 104 operates on the TLS security mode.

With respect to the dynamic-link library 106, the test script generation module 114 may represent the parent process of the application sharing protocol client process. As the creator, the man-in-the-middle implementation module 102 (or the performance testing tool) may pause the application sharing protocol client 104 after creation, perform the dynamic-link library 106 injection, and thereafter resume the application sharing protocol client 104. This functionality may provide for execution of the injected dynamic-link library 106.

The injected dynamic-link library 106 may alter the relevant API calls in the application sharing protocol client process, including process manipulation, dynamic-link library 106 load/unload, and socket communication. The dynamic-link library 106 load and unload may be performed, for example, through LoadLibray and FreeLibrary, for example, in WINDOWS API. These APIs in the application sharing protocol client 104 may be changed to LoadLibraryAlternative and FreeLibararyAlternative, respectively, through IAT alteration as disclosed herein. Process creation and socket communication may be similarly implemented (e.g., change CreateProcess to CreateProcessAlternative, and XYZStartup to XYZStartupAlternative). These changes may provide for redirection of the network communication between the application sharing protocol client 104 and the application sharing protocol server 108 to a different endpoint (e.g., to the apparatus 100). For example, when the application sharing protocol client 104 attempts to establish a connection to the application sharing protocol server 108 through "socket" and "connect" system APIs, the alternative functions "socketAlternative" and "connectAlternative" implemented in the man-in-the-middle implementation module 102 may be invoked. Alternatively, the target host and port may be changed to a local server inside the man-in-the-middle implementation module 102. In this manner, the application sharing protocol client 104 may obtain a socket handle to the local server. All following data sent by the application sharing protocol client 104 may arrive at the local server, and may be read through "recv" API in the dynamic-link library 106. Meanwhile, the man-in-the-middle implementation module 102 may start another connection to the application sharing protocol server 108. For the data packets from the application sharing protocol client 104, the dynamic-link library 106 may forward each data packet to the application sharing protocol server 108, and may alter the data as needed.

Figure 5:
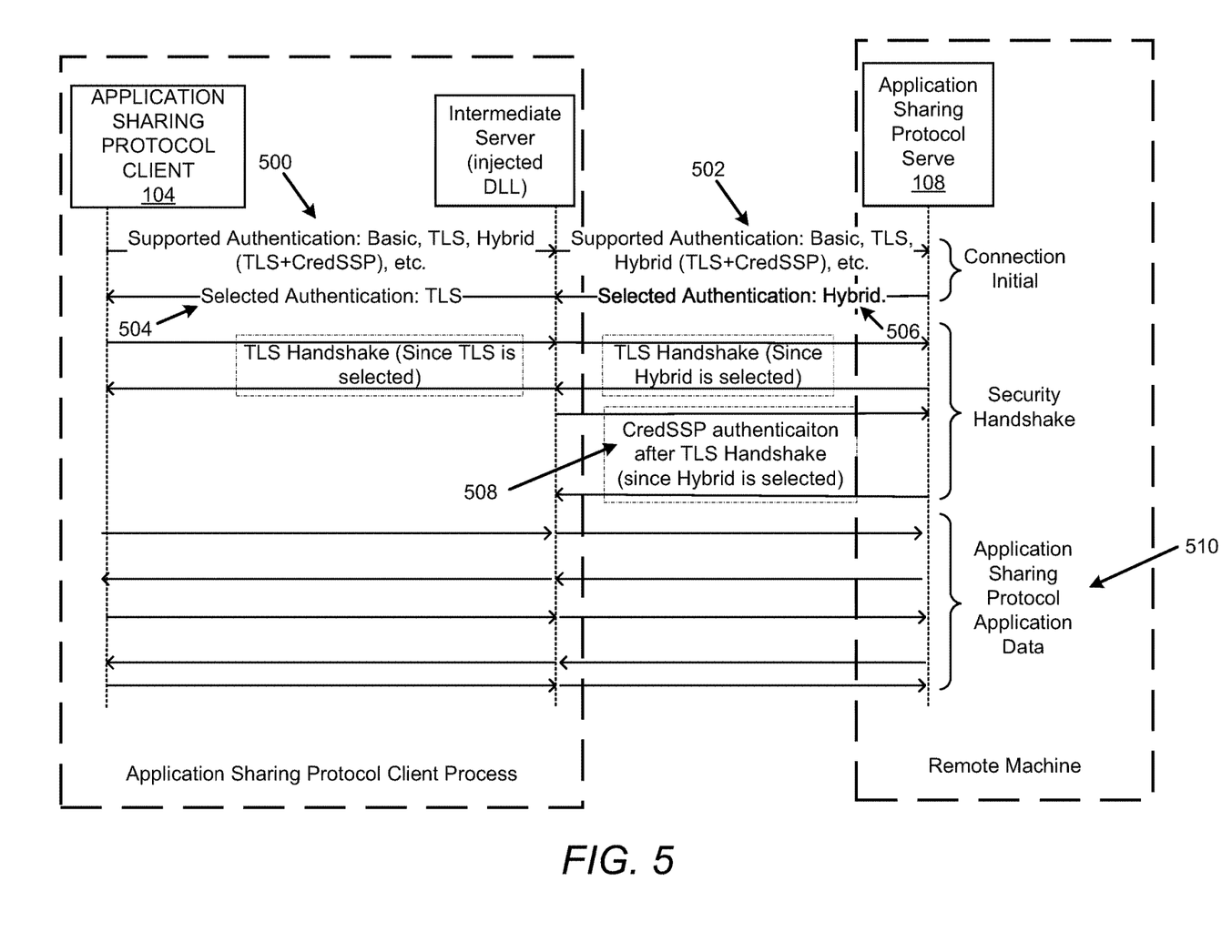
FIG. 5 illustrates captured communication during authentication to illustrate operation of the apparatus of FIG. 1.

With respect to configuration of the application sharing protocol client side, the application sharing protocol client 104 may support loading of settings from an external configuration file. The external configuration file may be used to disable CredSSP. In this regard, FIG. 5 illustrates captured communication during authentication to illustrate operation of the apparatus of FIG. 1. Referring to FIG. 5, which is described in further detail below, a lower security level (e.g., TLS authentication) may be directly returned during connection of an initial message exchange.

Referring again to FIG. 1, when the application sharing protocol client 104 connects to the application sharing protocol server 108, the communication recordation module 110 may intercept this connection. The communication recordation module 110 may prompt a user for credentials to login to the remote application sharing protocol server 108. After the credentials are received, the man-in-the-middle implementation module 102 may use data from the credentials to obtain a token from a third-party authentication server 112. As the man-in-the-middle implementation module 102 and the communication recordation module 110 may be implemented on the same machine as the application sharing protocol client 104, and the credentials may be provided by the user. Thus, the authentication server 112 and the application sharing protocol server 108 may identify the man-in-the-middle implementation module 102 as the application sharing protocol client 104. In this regard, the CredSSP may be needed by a user group policy to provide additional security over the TLS mode.

After CredSSP authentication, the traffic data in packets after CredSSP authentication may be the same as the TLS connection. Thus the man-in-the-middle implementation module 102 may forward the data between the application sharing protocol client 104 and the application sharing protocol server 108, and the communication recordation module 110 may record the data, for example, for test script generation. In this regard, when CredSSP is utilized by the server side, the man-in-the-middle implementation module 102 may partially bypass the CredSSP. Thus, the captured application sharing protocol session may continue to operate, and the recording process may be able to gather data to generate test scripts as needed.

Figure 2:
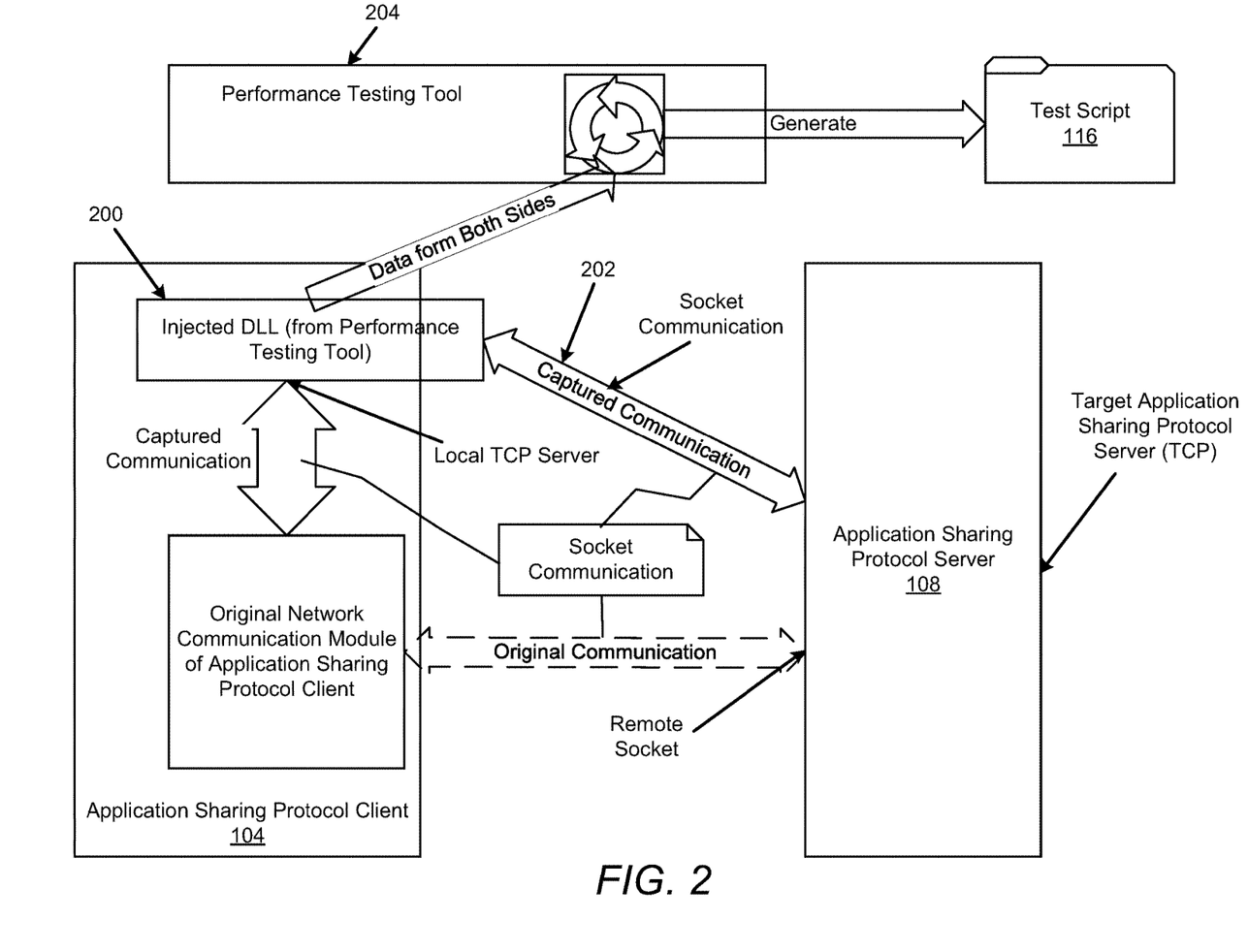
FIG. 2 illustrates a logical layout of the apparatus of FIG. 1 to illustrate interaction of various components.

FIG. 2 illustrates a logical layout of the apparatus of FIG. 1 to illustrate interaction of various components.

Referring to FIGS. 1 and 2, and particularly FIG. 2, at 200, the asymmetric man-in-the-middle implementation module 102 may inject, into the application sharing protocol client 104, the dynamic-link library 106 that alters application programming interface calls with respect to communication between the application sharing protocol client 104 and the application sharing protocol server 108.

At 202, for communication from the application sharing protocol client 104 to the application sharing protocol server 108, the asymmetric man-in-the-middle implementation module 102 may redirect, based on the dynamic-link library 106, the communication from the application sharing protocol client 104 to the apparatus 100, and further from the apparatus 100 to the application sharing protocol server 108. Similarly, for communication from the application sharing protocol server 108 to the application sharing protocol client 104, the asymmetric man-in-the-middle implementation module 102 may redirect, based on the dynamic-link library 106, the communication from the application sharing protocol server 108 to the apparatus 100, and further from the apparatus 100 to the application sharing protocol client 104. In this regard, At 204, the test script generation module 114 may generate, based on the ascertained data, the test script 116 to test operation of an application associated with the communication between the application sharing protocol client 104 and the application sharing protocol server 108.

Figure 3:
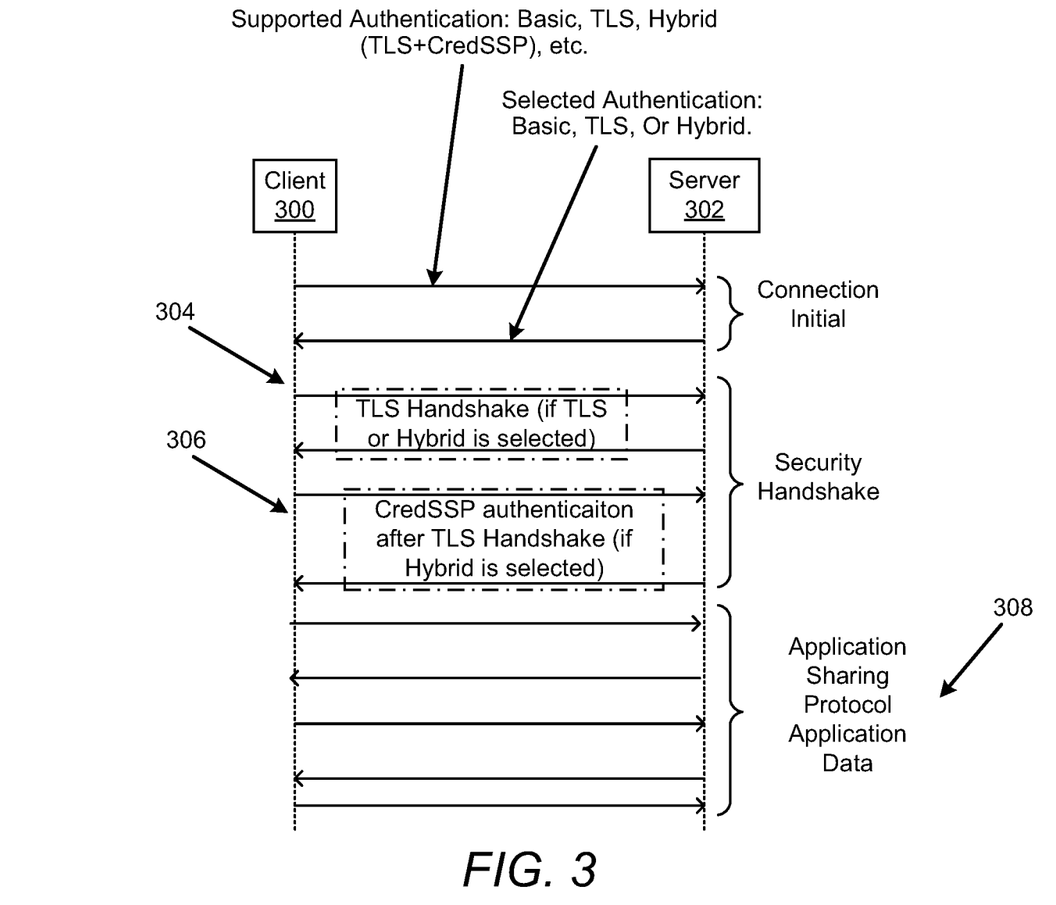
FIG. 3 illustrates application sharing protocol communication without a man-in-the-middle.

FIG. 3 illustrates application sharing protocol communication without a man-in-the-middle.

Referring to FIGS. 1 and 3, and particularly FIG. 3, without a man-in-the-middle, such as the man-in-the-middle implementation module 102, a client at 300 may communicate with a server at 302, for example, by implementing a TLS handshake at 304. The client at 300 may be similar to the application sharing protocol client 104, and the server at 302 may be similar to the application sharing protocol server 108. In this regard, at 306, CredSSP authentication may be performed at 306 after the TLS handshake. At 308, once the CredSSP authentication is performed at 306, data may be exchanged between the client at 300 and the server at 302.

Figure 4:
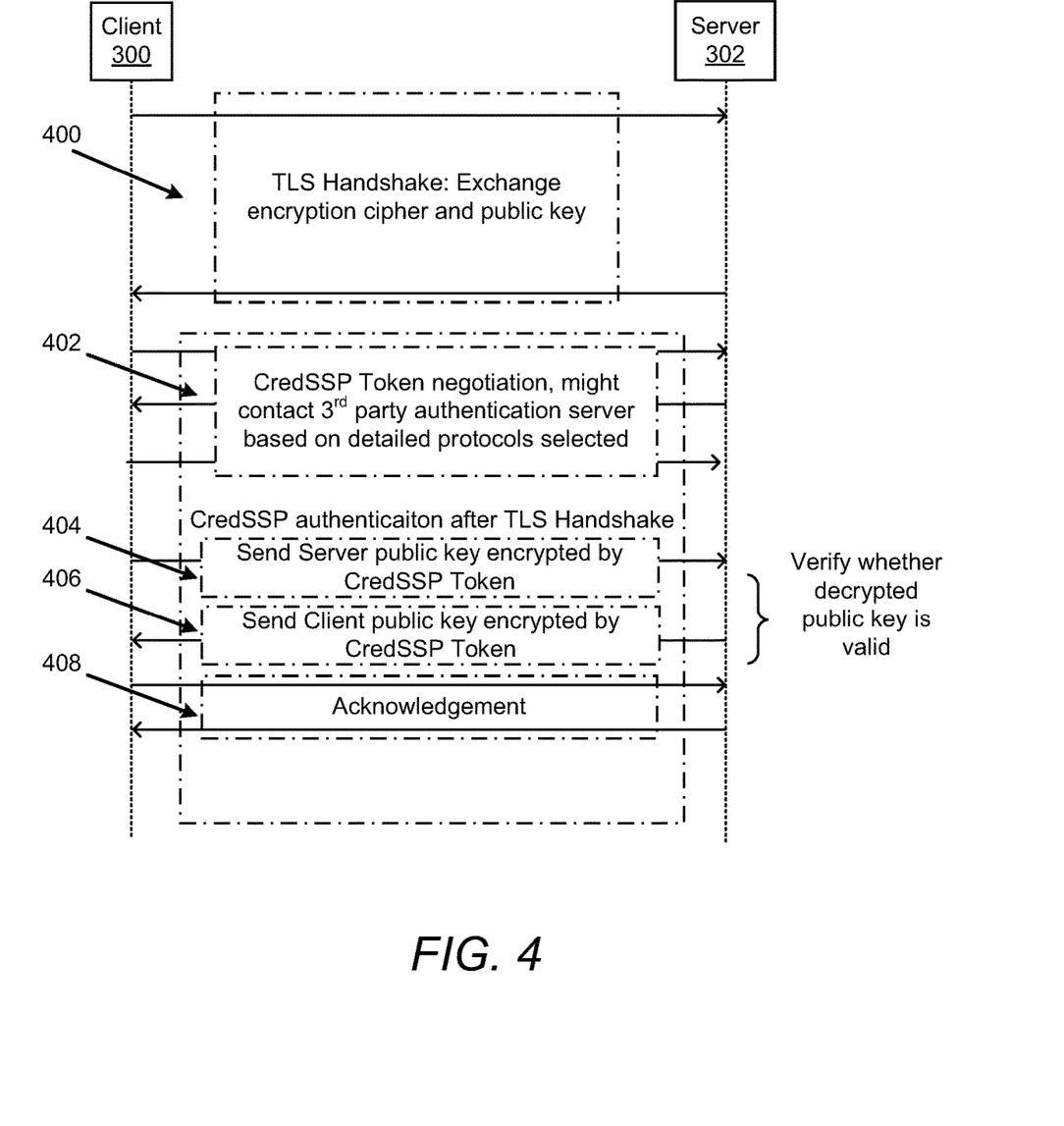
FIG. 4 illustrates drilled down Credential Security Support Provider protocol (CredSSP) authentication to illustrate operation of the apparatus of FIG. 1.

FIG. 4 illustrates drilled down CredSSP authentication to illustrate operation of the apparatus of FIG. 1.

Referring to FIGS. 1 and 4, and particularly FIG. 4, with respect to CredSSP authentication, at 400, a TLS handshake may include an exchange of encryption cipher and public key between the client at 300 and the server at 302. The TLS handshake may be implemented to create a secure channel between the application sharing protocol client 104 and the application sharing protocol server 108 to exchange data.

At 402, CredSSP token negotiation may be performed. In this regard, the server at 302 may contact a third-party authentication server, such as the authentication server 112, based on details of the protocol selected.

At 404, the client at 300 may send a server public-key encrypted by a CredSSP token, which may be generated at 402. With respect to the CredSSP token generated at 402, if there is a man-in-the-middle attack, the attacker may obtain the server's public key, but may not obtain the CredSSP token on behalf of the server, in which case the client may know that the server cannot be trusted.

At 406, the server at 302 may send a client public-key encrypted by the CredSSP token. The processes at 404 and 406 may be used to verify whether the decrypted public-key is valid.

At 408, acknowledgment of the client public-key encrypted by the CredSSP token may be exchanged between the client at 300 and the server at 302. With respect to CredSSP authentication, this process may provide an indication that the server has acknowledged the identity of the client, and the client may know that it may continue the application communication.

FIG. 5 illustrates captured communication during authentication to illustrate operation of the apparatus of FIG. 1.

Referring to FIGS. 1 and 5, and particularly FIG. 5, at 500, the supported authentication types for communication between the application sharing protocol client 104 and the asymmetric man-in-the-middle implementation module 102 may include basic, TLS, and hybrid (e.g., TLS and CredSSP). Basic authentication may represent a less secure security mechanism that may be used in certain types of application sharing protocol implementations. In basic authentication mode, the application sharing protocol may implement its own encryption (compared to TLS based encryption) mechanism, and all data (including username and password) may be exchanged under this mechanism.

At 502, the supported authentication types for communication between the asymmetric man-in-the-middle implementation module 102 and the application sharing protocol server 108 may include basic, TLS, and hybrid (e.g., TLS and CredSSP).

At 504, the asymmetric man-in-the-middle implementation module 102 may implement TLS authentication for communication between the apparatus 100 (e.g., the asymmetric man-in-the-middle implementation module 102) and the application sharing protocol client 104.

At 506, the asymmetric man-in-the-middle implementation module 102 may implement hybrid authentication for communication between the apparatus 100 (e.g., the asymmetric man-in-the-middle implementation module 102) and the application sharing protocol server 108.

At 508, the CredSSP authentication may be performed after the TLS handshake, since hybrid (e.g., TLS and CredSSP) authentication is selected.

At 510, the communication recordation module 110 may ascertain, based on the injected dynamic-link library 106, data from the communication between the application sharing protocol client 104 and the application sharing protocol server 108.

Figure 6:
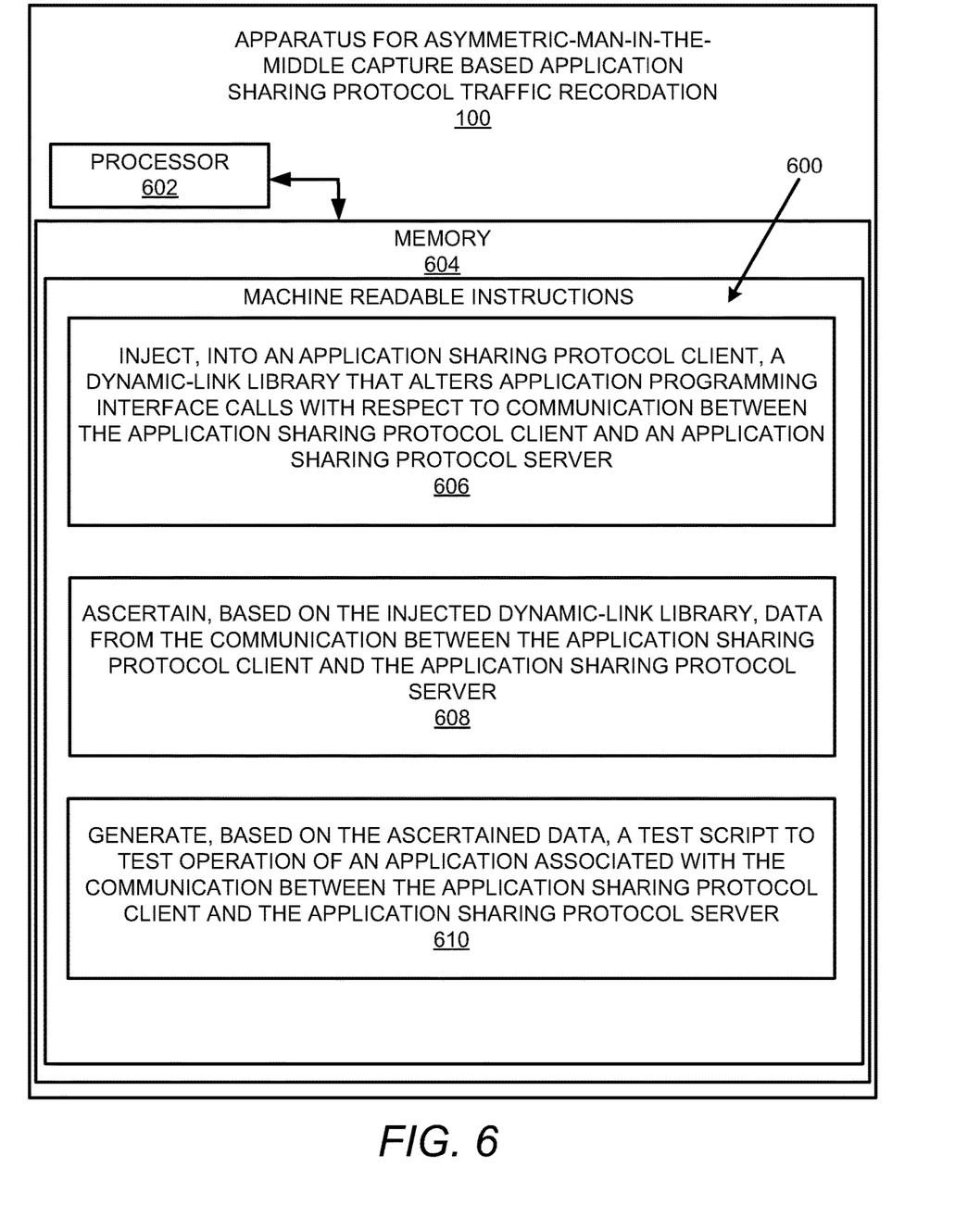
FIG. 6 illustrates an example block diagram for asymmetric-man-in-the-middle capture based application sharing protocol traffic recordation.
Figure 7:
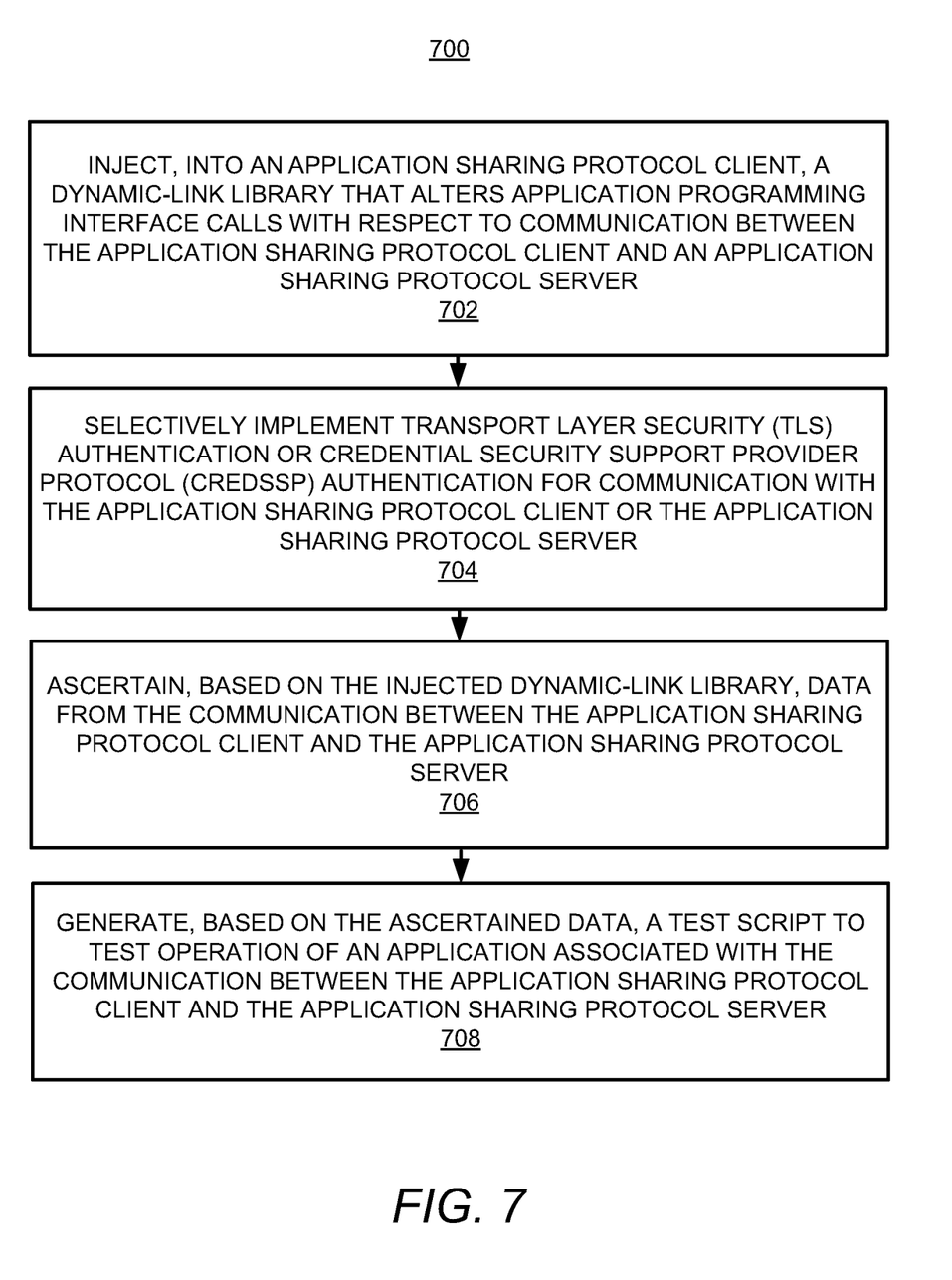
FIG. 7 illustrates an example flowchart of a method for asymmetric-man-in-the-middle capture based application sharing protocol traffic recordation.
Figure 8:
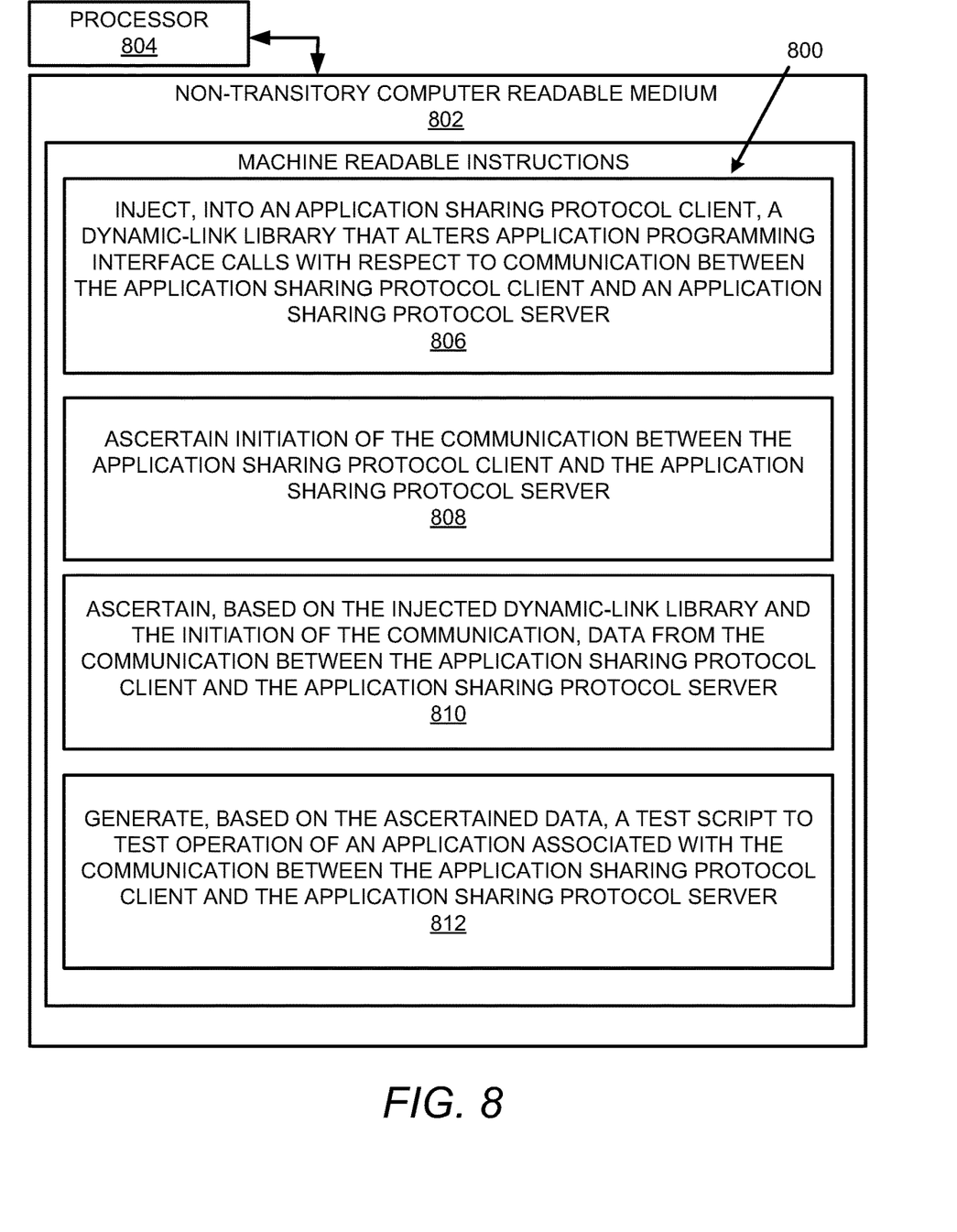
FIG. 8 illustrates a further example block diagram for asymmetric-man-in-the-middle capture based application sharing protocol traffic recordation.

FIGS. 6-8 respectively illustrate an example block diagram 600, an example flowchart of a method 700, and a further example block diagram 800 for asymmetric-man-in-the-middle capture based application sharing protocol traffic recordation. The block diagram 600, the method 700, and the block diagram 800 may be implemented on the apparatus 80 described above with reference to FIG. 1 by way of example and not limitation. The block diagram 600, the method 700, and the block diagram 800 may be practiced in other apparatus. In addition to showing the block diagram 600, FIG. 6 shows hardware of the apparatus 80 that may execute the instructions of the block diagram 600. The hardware may include a processor 602, and a memory 604 (i.e., a non-transitory computer readable medium) storing machine readable instructions that when executed by the processor 602 cause the processor to perform the instructions of the block diagram 600. The memory 604 may represent a non-transitory computer readable medium. FIG. 7 may represent a method for asymmetric-man-in-the-middle capture based application sharing protocol traffic recordation. FIG. 8 may represent a non-transitory computer readable medium 802 having stored thereon machine readable instructions to provide asymmetric-man-in-the-middle capture based application sharing protocol traffic recordation. The machine readable instructions, when executed, cause a processor 804 to perform the instructions of the block diagram 800 also shown in FIG. 8.

The processor 602 of FIG. 6 and/or the processor 804 of FIG. 8 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 802 of FIG. 8), such as hardware storage devices (e.g., RAM (random access memory), ROM (read only memory), EPROM (erasable, programmable ROM), EEPROM (electrically erasable, programmable ROM), hard drives, and flash memory). The memory 604 may include a RAM, where the machine readable instructions and data for a processor may reside during runtime.

Referring to FIGS. 1-6, and particularly to the block diagram 600 shown in FIG. 6, the memory 604 may include instructions 606 to inject, into an application sharing protocol client 104, a dynamic-link library 106 that alters application programming interface calls with respect to communication between the application sharing protocol client 104 and an application sharing protocol server 108.

The processor 602 may fetch, decode, and execute the instructions 608 to ascertain, based on the injected dynamic-link library 106, data from the communication between the application sharing protocol client 104 and the application sharing protocol server 108.

Based on a determination that the determined intent does not match the pre-specified intent, the processor 602 may fetch, decode, and execute the instructions 610 to generate, based on the ascertained data, a test script 116 to test operation of an application associated with the communication between the application sharing protocol client 104 and the application sharing protocol server 108.

Referring to FIGS. 1-5 and 7, and particularly FIG. 7, for the method 700, at block 702, the method may include injecting, into an application sharing protocol client 104, a dynamic-link library 106 that alters application programming interface calls with respect to communication between the application sharing protocol client 104 and an application sharing protocol server 108.

At block 704, the method may include selectively implementing TLS authentication or CredSSP authentication for communication with the application sharing protocol client 104 or the application sharing protocol server 108.

At block 706, the method may include ascertaining, based on the injected dynamic-link library 106, data from the communication between the application sharing protocol client 104 and the application sharing protocol server 108.

At block 708, the method may include generating, based on the ascertained data, a test script 116 to test operation of an application associated with the communication between the application sharing protocol client 104 and the application sharing protocol server 108.

Referring to FIGS. 1-5 and 8, and particularly FIG. 8, for the block diagram 800, the non-transitory computer readable medium 802 may include instructions 806 to inject, into an application sharing protocol client 104, a dynamic-link library 106 that alters application programming interface calls with respect to communication between the application sharing protocol client 104 and an application sharing protocol server 108.

The processor 804 may fetch, decode, and execute the instructions 808 to ascertain initiation of the communication between the application sharing protocol client 104 and the application sharing protocol server 108.

The processor 804 may fetch, decode, and execute the instructions 810 to ascertain, based on the injected dynamic-link library 106 and the initiation of the communication, data from the communication between the application sharing protocol client 104 and the application sharing protocol server 108.

The processor 804 may fetch, decode, and execute the instructions 812 to generate, based on the ascertained data, a test script 116 to test operation of an application associated with the communication between the application sharing protocol client 104 and the application sharing protocol server 108.

What has been described and illustrated herein is an example along with some of its variations. The terms, descriptions and figures used herein are set forth by way of illustration and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus, comprising:
   a processor; and
   a non-transitory computer readable medium storing machine readable instructions that when executed by the processor cause the processor to:
   inject, into an application sharing protocol client, a dynamic-link library that alters application programming interface calls with respect to communication between the application sharing protocol client and an application sharing protocol server;
   ascertain, based on the injected dynamic-link library, data from the communication between the application sharing protocol client and the application sharing protocol server; and generate, based on the ascertained data, a test script to test operation of an application associated with the communication between the application sharing protocol client and the application sharing protocol server,
wherein the application programming interface calls are altered using an altered import address table of the dynamic-link library.

2. The apparatus according to claim 1, wherein the instructions are further to cause the processor to:
implement Transport Layer Security (TLS) authentication for communication between the apparatus and the application sharing protocol client.

3. The apparatus according to claim 1, wherein the instructions are further to cause the processor to:
implement Credential Security Support Provider protocol (CredSSP) authentication for communication between the apparatus and the application sharing protocol server.

4. The apparatus according to claim 1, wherein the instructions to inject, into the application sharing protocol client, the dynamic-link library that alters application programming interface calls with respect to the communication between the application sharing protocol client and the application sharing protocol server are further to cause the processor to:
for communication from the application sharing protocol client to the application sharing protocol server, redirect, based on the dynamic-link library, the communication
from the application sharing protocol client to the apparatus, and
further from the apparatus to the application sharing protocol server.

5. The apparatus according to claim 1, wherein the instructions to inject, into the application sharing protocol client, the dynamic-link library that alters application programming interface calls with respect to the communication between the application sharing protocol client and the application sharing protocol server are further to cause the processor to:
for communication from the application sharing protocol server to the application sharing protocol client, redirect, based on the dynamic-link library, the communication
from the application sharing protocol server to the apparatus, and
further from the apparatus to the application sharing protocol client.

6. The apparatus according to claim 1, wherein the instructions to ascertain, based on the injected dynamic-link library, data from the communication between the application sharing protocol client and the application sharing protocol server are further to cause the processor to:
ascertain initiation of the communication between the application sharing protocol client and the application sharing protocol server;
ascertain, based on the initiation of the communication between the application sharing protocol client and the application sharing protocol server, credentials to login to the application sharing protocol server;
utilize the credentials to obtain a token from an authentication server; and
utilize the token for Credential Security Support Provider protocol (CredSSP) authentication to forward the data between the application sharing protocol client and the application sharing protocol server.

7. The apparatus according to claim 1, wherein the instructions are further to cause the processor to:
implement the dynamic-link library to alter the application programming interface calls that include a socket application programming interface call with respect to the communication between the application sharing protocol client and the application sharing protocol server.

8. The apparatus according to claim 1, wherein the instructions are further to cause the processor to:
implement the dynamic-link library to alter the application programming interface calls that include a connection application programming interface call with respect to the communication between the application sharing protocol client and the application sharing protocol server.

9. A computer implemented method comprising:
injecting, by a processor and into an application sharing protocol client, a dynamic-link library that alters application programming interface calls with respect to communication between the application sharing protocol client and an application sharing protocol server;
selectively implementing Transport Layer Security (TLS) authentication or Credential Security Support Provider protocol (CredSSP) authentication for communication with the application sharing protocol client or the application sharing protocol server;
ascertaining, based on the injected dynamic-link library, data from the communication between the application sharing protocol client and the application sharing protocol server; and
generating, based on the ascertained data, a test script to test operation of an application associated with the communication between the application sharing protocol client and the application sharing protocol server,
wherein the application programming interface calls are altered using an altered import address table of the dynamic-link library.

10. The computer implemented method according to claim 9, wherein injecting, into the application sharing protocol client, the dynamic-link library that alters application programming interface calls with respect to the communication between the application sharing protocol client and the application sharing protocol server further comprises:
for communication from the application sharing protocol client to the application sharing protocol server, redirecting, based on the dynamic-link library, the communication
from the application sharing protocol client to an intermediate location, and
further from the intermediate location to the application sharing protocol server.

11. The computer implemented method according to claim 9, wherein injecting, into the application sharing protocol client, the dynamic-link library that alters application programming interface calls with respect to the communication between the application sharing protocol client and the application sharing protocol server further comprises:
for communication from the application sharing protocol server to the application sharing protocol client, redirecting, based on the dynamic-link library, the communication from the application sharing protocol server to an intermediate location, and further from the intermediate location to the application sharing protocol client.

12. The computer implemented method according to claim 9, wherein ascertaining, based on the injected dynamic-link library, data from the communication between the application sharing protocol client and the application sharing protocol server further comprises:
 ascertaining initiation of the communication between the application sharing protocol client and the application sharing protocol server;
 ascertaining, based on the initiation of the communication between the application sharing protocol client and the application sharing protocol server, credentials to login to the application sharing protocol server;
 utilizing the credentials to obtain a token from an authentication server; and
 utilizing the token for CredSSP authentication to forward the data between the application sharing protocol client and the application sharing protocol server.

13. The computer implemented method according to claim 9, further comprising:
 implementing the dynamic-link library to alter the application programming interface calls that include a socket application programming interface call with respect to the communication between the application sharing protocol client and the application sharing protocol server.

14. The computer implemented method according to claim 9, further comprising:
 implementing the dynamic-link library to alter the application programming interface calls that include a connection application programming interface call with respect to the communication between the application sharing protocol client and the application sharing protocol server.

15. A non-transitory computer readable medium having stored thereon machine readable instructions, the machine readable instructions, when executed, cause a processor to:
 inject, into an application sharing protocol client, a dynamic-link library that alters application programming interface calls with respect to communication between the application sharing protocol client and an application sharing protocol server;
 ascertain initiation of the communication between the application sharing protocol client and the application sharing protocol server;
 ascertain, based on the injected dynamic-link library and the initiation of the communication, data from the communication between the application sharing protocol client and the application sharing protocol server; and
 generate, based on the ascertained data, a test script to test operation of an application associated with the communication between the application sharing protocol client and the application sharing protocol server,
 wherein the application programming interface calls are altered using an altered import address table of the dynamic-link library.

16. The non-transitory computer readable medium according to claim 15, wherein the machine readable instructions to ascertain, based on the injected dynamic-link library and the initiation of the communication, data from the communication between the application sharing protocol client and the application sharing protocol server, when executed, further cause the processor to:
 ascertain, based on the initiation of the communication between the application sharing protocol client and the application sharing protocol server, credentials to login to the application sharing protocol server;
 utilize the credentials to obtain a token from an authentication server; and
 utilize the token for Credential Security Support Provider protocol (CredSSP) authentication to forward the data between the application sharing protocol client and the application sharing protocol server.

17. The non-transitory computer readable medium according to claim 15, wherein the machine readable instructions, when executed, further cause the processor to:
 implement Transport Layer Security (TLS) authentication for communication with the application sharing protocol client.

18. The non-transitory computer readable medium according to claim 16, wherein the machine readable instructions, when executed, further cause the processor to:
 implement the CredSSP authentication for communication with the application sharing protocol server.

19. The non-transitory computer readable medium according to claim 15, wherein the machine readable instructions to inject, into the application sharing protocol client, the dynamic-link library that alters application programming interface calls with respect to communication between the application sharing protocol client and the application sharing protocol server, when executed, further cause the processor to:
 for communication from the application sharing protocol client to the application sharing protocol server, redirect, based on the dynamic-link library, the communication
  from the application sharing protocol client to an intermediate location, and
  further from the intermediate location to the application sharing protocol server.

20. The non-transitory computer readable medium according to claim 15, wherein the machine readable instructions to inject, into the application sharing protocol client, the dynamic-link library that alters application programming interface calls with respect to communication between the application sharing protocol client and the application sharing protocol server, when executed, further cause the processor to:
 for communication from the application sharing protocol server to the application sharing protocol client, redirect, based on the dynamic-link library, the communication
  from the application sharing protocol server to an intermediate location, and
  further from the intermediate location to the application sharing protocol client.

* * * * *